United States Patent [19]

Wardle et al.

[11] Patent Number: 4,952,644

[45] Date of Patent: Aug. 28, 1990

[54] SYNTHESIS OF ABA TRIBLOCK POLYMERS AND $A_nB$ STAR POLYMERS FROM CYCLIC ETHERS

[75] Inventors: Robert B. Wardle; Jerald C. Hinshaw, both of Logan; William W. Edwards, Tremonton, all of Utah

[73] Assignee: Thiokol Corporation, Ogden, Utah

[21] Appl. No.: 362,633

[22] Filed: Jun. 7, 1989

[51] Int. Cl.$^5$ .................... C08G 59/68; C08G 65/04; C08L 71/00
[52] U.S. Cl. .................... 525/410; 528/405; 528/416; 528/417
[58] Field of Search ................ 525/410; 528/405, 416, 528/417

[56] References Cited

U.S. PATENT DOCUMENTS

| | | | |
|---|---|---|---|
| 3,636,132 | 7/1970 | Saegusa et al. | 525/410 |
| 4,393,199 | 7/1983 | Manser | 528/408 |
| 4,483,978 | 11/1984 | Manser | 528/408 |
| 4,806,613 | 2/1989 | Wardle | 528/59 |

*Primary Examiner*—John C. Bleutge
*Assistant Examiner*—Vasu S. Jagannathan
*Attorney, Agent, or Firm*—Wayne E. Nacker; Gerald K. White; Allen H. Erickson

[57] ABSTRACT

ABA triblock and $A_nB$ star polymers are produced by sequential cationic polymerization of 4 and 5 member ring cyclic ethers to initially form a B block and subsequent cationic polymerization of 4 and 5 member ring cyclic ethers to form A blocks at the termini of the B block. The B block is grown from the hydroxyl groups of a polyol having two or more hydroxyl groups, resulting in a B block having terminal hydroxyl functionality of two or greater. In growing each of the B and A blocks, the acid catalyst is used at a molar ratio relative to hydroxyl groups of the polyol initiator of between about 0.05:1 and about 0.5:1.

4 Claims, No Drawings

SYNTHESIS OF ABA TRIBLOCK POLYMERS AND $A_nB$ STAR POLYMERS FROM CYCLIC ETHERS

The present invention is directed to a method of synthesis of ABA triblock polymers and $A_nB$ star polymers from cyclic ethers. More particularly, the invention is directed to polymers synthesized by sequential polymerization of cyclic ethers having 4 and 5 member rings, i.e., substituted and unsubstituted oxetane and tetrahydrofuran (THF).

BACKGROUND OF THE INVENTION

U.S. Pat. No. 3,636,132 issued Jan. 18, 1972 to Saegusa, et al., the teachings of which are incorporated by reference, describes the synthesis of ABA block copolymers produced by sequential polymerization of substituted oxetanes and THF's. By selection of A blocks which are crystalline at ambient temperatures and B blocks which are amorphous at room temperature, block polymers are produced which exhibit thermoplastic characteristics. This patent notes that homopolymers of 4 and 5 member ring cyclic ethers tend to be crystalline and copolymers tend to be amorphous at ambient temperatures. However, it is known that some homopolymer blocks may be amorphous at ambient temperatures.

U.S. Pat. No. 4,393,199 issued July 12, 1983 to Manser, the teachings of which are incorporated herein by reference, describes cationic polymerization of cyclic ethers using a polyol initiator and an acid catalyst. This patent teaches that a ratio of diol to a Lewis Acid, i.e., the ratio of butanediol to $BF_3$ initiator species, should be about 1:2, which is about 1 mole of $BF_3$ for each mole of hydroxyl groups. In Example 6, U.S. Pat. No. 4,393,199 teaches that no polymerization occurs if the ratio of butanediol to $BF_3$ is 1:1.

U.S. Pat. No. 4,483,978 issued Nov. 20, 1984 to Manser, the teachings of which are incorporated by reference, is directed to copolymerization of 4 and 5 member ring cyclic ethers.

U.S. Pat. No. 4,806,613 issued Feb. 21, 1989 to Wardle, the teachings of which are incorporated herein by reference, notes deficiencies with known sequential cationic polymerization methods for obtaining thermoplastic elastomeric characteristics from 4 and 5 member ring cyclic ethers. Because such block polymers which exhibit thermoplastic elastomers have significant potential for use as binders in high-energy compositions, such as explosives, propellants, gasifiers and the like, this patent takes a different approach to producing thermoplastic block polymers. This patent proposes separately synthesizing crystalline A blocks and amorphous B blocks and then linking the A and B blocks. Although the method taught in this patent has produced thermoplastic, elastomeric block polymers having good characteristics especially suitable for binder use in high-energy compositions, the linking method taught therein is a multi-step procedure which results in a higher cost in producing the desired block polymers. As large quantities of thermoplastic elastomer may be required, for example, to serve as a propellant binder in a large rocket motor, new methods of synthesizing thermoplastic, elastomeric block polymers from cyclic ethers is desirable.

SUMMARY OF THE INVENTION

The invention relates to an improvement in sequential cationic polymerization of cyclic ethers to produce ABA and $A_nB$ block polymers. The individual A and B blocks are sequentially grown as pseudo-living polymers from the hydroxyl groups of diols and alcohols having higher hydroxyl functionality. In the general type of reaction, an acid catalyst is reacted with the alcohol to form an adduct which is referred to as the initiator. This adduct complexes with a cyclic ether monomer to form an activated cyclic ether. Because less than one-half of an equivalent of acid catalyst is employed for each hydroxyl functionality, a large amount of free alcohol is not complexed, and, therefore is available in the reaction mixture at all times. The hydroxyl groups of the alcohol then react with activated cyclic ether monomers, opening the rings and resulting in terminal hydroxyl groups being on the exposed ends of the (formerly-cyclic) ether residues. These resulting species are the propogating chain. The hydroxyl groups at the end of the polymer chain attack further activated cyclic ether monomers, opening the rings and again leaving terminal hydroxyl groups. These species are referred to herein as pseudo-living polymers. polymerization proceeds in this manner until substantial exhaustion of cyclic ether monomers or until the reaction is terminated in another manner.

If an ABA polymer is desired, the initiating alcohol is a diol. An initial reaction is run with a monomer or monomers which are to form the B block. The B block which results has two alcohol endgroups from which additional cationic polymerization can take place. From these ends are grown A blocks using an appropriate monomer or monomers. The synthesis may be carried out as a one-pot method using sequential polymerization where addition of the B block monomer(s) and second A block monomer(s) is timed to ensure completion of the previously formed block. Alternatively, the reaction may be quenched after completion of each block, the polymer isolated, and the reaction restarted with fresh monomer.

If $A_nB$ star polymer is desired, the initiating alcohol has a hydroxyl functionality of three or higher; typically a triol or tetraol is used. B block arms are grown from the hydroxyl groups of the alcohol, and when the reaction is either substantially complete or quenched, the A blocks are grown from the ends of the B block arms In accordance with the present invention, the acid catalyst is employed at a level at between about 0.05 and about 0.5 equivalents relative to the hydroxyl functionality of the initiating alcohol. Thus, if the initiating alcohol is a diol the acid catalyst is used at between about a 0.10 to about a 1 molar ratio relative to moles of the diol. The reaction, which uses substantially lower levels of acid catalyst relative to hydroxyl groups than that taught in the prior art, is more controllable than prior art reactions, achieves greater incorporation of the polyfunctional alcohol within the polymer chain and provides a substantially lower polydispersity.

DETAILED DESCRIPTION OF CERTAIN PREFERRED EMBODIMENTS

The invention is directed to formation of ABA and $A_nB$ polymers by sequential polymerization of cyclic ethers, having rings of 4 or 5 atoms. Particularly, the invention is directed to sequential cationic polymerization of oxetane, substituted oxetanes, tetrahydrofuran, and substituted tetrahydrofurans. Suitable substituted oxetanes and tetrahydrofurans are described, for example, in referenced U.S. Nos. 4,483,978 and 4,707,540. Polymerizations to form the several blocks of the polymers in accordance with the invention may be conducted with a single monomer species or a mixture of monomer species. It is common, for example, to copolymerize THF and a substituted oxetane monomer.

Oxetane and tetrahydrofuran monomer units used in forming the blocks of the present invention have the general formulae;

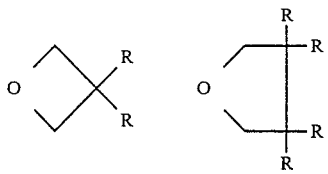

wherein the R groups are the same or different and are selected from moieties having the general formulae:

—$(CH_2)_n$X, where n is 0–10 and X is selected from the group consisting of —H, —$NO_2$, —CN, —Cl, F, —O—alkyl, —OH, —I, —$ONO_2$, —$N(NO_2)$-alkyl, —C≡CH, —Br, —CH=CH(H or alkyl), —O—CO—(H or alkyl), —$CO_2$—(H or alkyl), —N(H or alkyl)$_2$, —O—$(CH_2)_{1-5}$—O—$(CH_2)_{0-8}$—$CH_3$, and $N_3$.

Examples of oxetanes used in forming block polymers in accordance with the invention include but are not limited to:

DMO 3,3-dimethyl oxetane,
BEMO 3,3-bis(ethoxymethyl)oxetane,
BCMO 3,3-bis(chloromethyl)oxetane,
BMMO 3,3-bis(methoxymethyl)oxetane.
BFMO 3,3-bis(fluoromethyl)oxetane,
HMMO 3-hydroxymethyl-3-methyloxetane,
BAOMO 3,3-bis(acetoxymethyl)oxetane,
BHMO 3,3-bis(hydroxymethyl)oxetane,
OMMO 3-octoxymethyl-3-methyloxetane,
BMEMO 3,3-bis(methoxyethoxymethyl)oxetane,
CMMO 3-chloromethyl-3-methyloxetane,
AMMO 3-azidomethyl-3-methyloxetane,
BIMO 3-3-bis(iodomethyl)oxetane,
IMMO 3-iodomethyl-3-methyloxetane,
PMMO 3-propynomethylmethyloxetane,
BNMO 3,3-bis(nitratomethyl)oxetane,
NMMO 3-nitratomethyl-3-methyloxetane,
BMNAMO 3,3-bis(methylnitraminomethyl)oxetane,
MNAMMO 3-methylnitraminomethyl-3-methyloxetane, and
BAMO 3,3-bis(azidomethyl)oxetane.

The functionality of the alcohol used for initiation depends upon whether it is desired to produce an ABA triblock polymer or an $A_nB$ star polymer. If it is desired to produce an ABA triblock polymer, a diol is used to initiate polymerization of a difunctional B block polymer If an star polymer is desired, a polyol of functionality n of 3 or more (generally 3 or 4) is used to form a B block having n arms. Preferably, the hydroxyl groups of the polyol are generally unhindered. Suitable diols include, but are not limited to ethylene glycol, propylene glycol, 1,3,-propanediol, and 1 4-butanediol. Suitable triols include, but are not limited to glycerol, trimethylopropane and 1,2,4-butanetriol. A suitable tetraol is, but is not limited to, 2,2'(oxydimethylene)bis(2-ethyl-1,3,propanediol).

Generally, it is desirable to form ABA or $A_nB$ polymers with B blocks which are amorphous and elastomeric at ambient temperature and A blocks which are crystalline at ambient temperatures, in which case the resulting block polymers are thermoplastic elastomers. Such thermoplastic elastomers may serve as binders in high-energy compositions, such as explosives, propellants, gasifiers and the like. Selection of appropriate monomers and mixtures of monomers to form the crystalline A blocks and amorphous B blocks are known in the art, for example, above-referenced U.S. Pat. No. 4,806,613.

By ambient temperature is meant herein a temperature range from about 15° C. and about 25° C. For many applications, however, the block polymer should retain its thermoplastic elastomeric characteristics over a much wider temperature range. Typically propellant binders should remain elastomeric down to at least −40° C. and even down to −60° C., and B blocks are selected in accordance with known properties of polyethers which are amorphous down to these temperatures. On the other hand, high-energy compositions are typically subjected to storage temperatures up to about 60° C., and A blocks are selected which remain crystalline above about 60° C. for such applications.

The acid catalysts may be chosen from among those known in the art, including Lewis acids, such as $AlCl_3$, $BF_3$, $TiCl_4$, $ZnI_2$, $SiF_4$, $SbF_6$, $PF_5$, $AsF_5$, and $SbCl_5$, and strong acids such as $FSO_3H$, $ClSO_3H$, $HClO$, $HIO$, and $CF_3SO_3H$. The acid catalyst forms a preinitiator adduct with the polyol, for example, butane diol is known to form an adduct with boron trifluoride ($BF_3$).

In accordance with the invention, the acid catalyst is used at a much lower level relative to hydroxyl groups of the polyhydric alcohol than is taught in the prior art. In direct contrast to the teachings of the above-referenced U.S. Pat. No. 4,393,199, it is discovered that a much more controlled reaction occurs if a Lewis acid is used at a molar ratio relative to hydroxyl groups of the polyhydric alcohol of 0.5:1 or less, i.e., from about 0.05:1 to about 0.5:1. If a proton acid is used as the initiator, the ratio of hydrogen ions released by the acid catalyst to the hydroxyl groups of the alcohol is from about 0.05:1 to about 0.5:1. By using a substantially lower level of acid catalyst, incorporation of a greater percentage of the polyhydric alcohol molecules within polymer molecules is achieved and lower polydispersity is achieved.

The invention will now be described in greater detail by way of specific examples:

GENERAL EXPERIMENTAL INFORMATION

Methylene chloride was distilled from phosphorus pentoxide under argon immediately prior to use. Butanediol, benzyl alcohol and non-energetic oxetane monomers were distilled from calcium hydride under argon or vacuum, as appropriate, and stored in sealed containers until used. BAMO, AMMO and NMMO were purified and dried by passing through a column of neutral or basic alumina immediately prior to use. Reactions were run under an atmosphere of argon or nitrogen which had been dried by passage through a drying tower filled with anhydrous calcium sulfate. Reaction flasks were dried under vacuum and purged with argon or nitrogen which were dried under vacuum and purged with argon or nitrogen and evacuated under high vacuum several times using a manifold system. Syringes and reaction flasks dried at least 12 hours in an over (110°–120° C.) and cooled in a desiccator over anhydrous calcium sulfate prior to use. Proton nuclear magnetic resonance (NMR) spectra were recorded with a Varian XL-300 spectrometer at 300 MHz.

EXAMPLE 1

To a stirred solution of 0.14 ml (1.57 mmol) of butanediol in 11.6 ml of $CH_2Cl_2$ were added 0.097 ml (0.78 mmol) of boron trifluoride etherate. After 10 minutes, 3.68 ml (31.5 mmol) of an 88% solution of AMMO in $CH_2Cl_2$ were added. After 24 hours, 50% of the solution was removed and quenched by dilution with $CH_2Cl_2$ and saturated aqueous sodium bicarbonate. The layers were separated, the organic phase dried ($MgSO_4$) and all volatiles removed under reduced pressure to afford a sample of the intermediate AMMO polymer. This material had the following characteristics as measured by GPC: $M_w=4030$, $M_n=2490$, polydispersity=1.62. To the unquenched 50% of the AMMO polymerization reaction mixture were added 2.14 ml (15.7 mmol) of BAMO. After 120 hours, the reaction mixture was quenched by addition of $CH_2Cl_2$ and saturated aqueous sodium bicarbonate. The layers were separated, the organic phase dried ($MgSO_4$) and all volatiles removed under reduced pressure to afford the product as a white, solid material. The product had the following characteristics as measured by GPC: $M_w=6680$, $M_n=3750$ and polydispersity=1.78. The hydroxyl equivalent weight of the final product was 2392 g/eq by an isocyanate titration method. $^1$NMR analysis suggested a molecular weight of 4048 g/mol and showed that over 80% of all endgroups were BAMO derived (theory for a perfect ABA is 100%).

EXAMPLE 2

To a stirred solution of 0.53 ml (5.98 mmol) of butanediol in 50 ml of $CH_2Cl_2$ were added 0.36 ml (2.9 mmol) of boron trifluoride etherate. After stirring for 30 minutes, to this solution were added 18.8 g (148 mmol) of AMMO. After 24 hours the entire reaction was quenched as described above to afford poly(AMMO) as a very slightly yellow oil. This material had a hydroxyl equivalent weight of 1689 g/eq and a $^1$H NMR determined molecular weight of 3040 g/mol. GPC data were: $M_w=4100$, $M_n=2500$ and polydispersity=1.67. To a solution of 4.02 g (1.32 mmol) of this polymer in 10 ml of $CH_2Cl_2$ were added 0.077 ml (0.63 mmol) of boron trifluoride etherate. After 15 minutes, 5.32 g (31.6 mmol) of BAMO were added in one portion. After 72 hours, the reaction was quenched and worked up as described above to afford the product as a white solid material. The product had the following characteristics as measured by GPC: $M_w=6830$, $M_n=4110$ and polydispersity=1.66. $^1$H NMR analysis suggested a molecular weight of 7179 g/mol and showed that over 70% of all endgroups were BAMO derived (theory for a perfect ABA is 100%).

While the invention has been described in respect to certain preferred embodiments, modifications obvious to one with ordinary skill in the art may be made without departing from the scope of the present invention.

For example, although the invention contemplates growing a central B block of hydroxyl functionality of 2 or more and then growing A blocks from the ends of the B block to form either an ABA or $A_nB$ polymer, it is considered obvious, though less desirable, to use a monofunctional alcohol as the initiator and alternately grow A and B blocks therefrom to form ABA and $(AB)_n$ polymers.

Various features of the invention are set forth in the following claims.

What is claimed is:

1. A method of forming an ABA triblock polymer or an $A_nB$ star polymer comprising
    (1) polymerizing a cyclic ether monomer or monomers having 4 to 5 atoms in the cyclic ring from the hydroxyl groups of an alcohol having two or more hydroxyl groups in the presence of an acid catalyst that promotes cationic polymerization of cyclic ether monomers so as to produce a B block polymer having terminal hydroxyl functionality substantially equivalent to the hydroxyl functionality of said alcohol, and
    (2) polymerizing a different cyclic ether monomer or monomers or different combination of cyclic ether monomers, having 4 or 5 atoms in the cyclic rings, from said terminal hydroxyl groups of said B block polymer in the presence of an acid catalyst that promotes cationic polymerization of cyclic ether monomers so as to produce polymeric A blocks at the ends of said B block,
    the improvement comprising,
    in each of steps 1 and 2, said catalyst being provided in an amount such that if said acid catalyst is a Lewis acid, the molar ratio of acid catalyst to hydroxyl group(s) on said alcohol is between about 0.05:1 and about 0.5:1, and if said acid catalyst is a proton acid, the molar ratio of hydrogen ions releasable from said acid to hydroxyl group(s) of said alcohol is from about 0.05:1 and about 0.5:1.

2. A method according to claim 1 wherein said cyclic ether monomer or monomers polymerized in step (1) are selected such that said B block is amorphous at ambient temperatures, and cyclic ether monomer or monomers polymerized in step (2) are selected such that said A blocks are crystalline at ambient temperatures, whereby the resulting block polymer exhibits thermoplastic elastomer characteristics.

3. The product of the process of claim 1 wherein said alcohol has two hydroxyl groups, whereby an ABA triblock polymer is produced.

4. The method according to claim 1 wherein said alcohol has three or more hydroxyl groups, whereby an $A_nB$ star polymer is produced.

* * * * *